United States Patent
Oh et al.

(10) Patent No.: US 10,100,899 B2
(45) Date of Patent: Oct. 16, 2018

(54) APPARATUS FOR REDUCING VIBRATION OF VEHICLE

(71) Applicant: HYUNDAI MOTOR COMPANY, Seoul (KR)

(72) Inventors: Wan Soo Oh, Yongin-si, Gyeonggi-do (KR); Jang Won Lee, Yongin-si, Gyeonggi-do (KR); Jae Woong Hwang, Yongin-si, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 190 days.

(21) Appl. No.: 14/937,389

(22) Filed: Nov. 10, 2015

(65) Prior Publication Data

US 2016/0333962 A1 Nov. 17, 2016

(30) Foreign Application Priority Data

May 14, 2015 (KR) .................. 10-2015-0067492

(51) Int. Cl.
| | | |
|---|---|---|
| *F16F 15/14* | (2006.01) | |
| *F16F 15/134* | (2006.01) | |
| *F16H 45/02* | (2006.01) | |

(52) U.S. Cl.
CPC ...... *F16F 15/145* (2013.01); *F16F 15/13484* (2013.01); *F16H 45/02* (2013.01)

(58) Field of Classification Search
CPC .. F16F 15/145; F16F 15/1464; F16F 15/1407; F16F 15/131; F16F 15/13121; F16F 15/13128; F16F 15/13185; F16F 15/13484; F16F 15/283; F16H 2045/0263; Y10T 74/2128
See application file for complete search history.

(56) References Cited

U.S. PATENT DOCUMENTS

| | | | |
|---|---|---|---|
| 2010/0200347 A1 | 8/2010 | Engelmann et al. | |
| 2014/0026712 A1 | 1/2014 | Movlazada | |

FOREIGN PATENT DOCUMENTS

| | | | | |
|---|---|---|---|---|
| DE | 2850577 A1 | * | 6/1979 | ............ F16H 41/04 |
| JP | H11-30292 | | 2/1992 | |
| JP | 2010-144836 A | | 7/2010 | |
| JP | 2013-076417 A | | 4/2013 | |
| KR | 10-2002-0044218 | | 6/2002 | |
| KR | 10-2014-0004843 | | 1/2014 | |
| KR | 10-2014-0077060 | | 6/2014 | |

OTHER PUBLICATIONS

EPO Translation of DE 2850577 A1, Davis et al., Jun. 7, 1979. (Year: 2018).*

* cited by examiner

*Primary Examiner* — Daniel D Yabut
(74) *Attorney, Agent, or Firm* — Brinks Gilson & Lione

(57) ABSTRACT

The present disclosure provides an apparatus for reducing vibration of a vehicle including; a lug which connects an engine to a torque converter and forms a predetermined gap between the engine and the torque converter; and an inertial body which is connected to the lug between the engine and the torque converter. the inertial body moves in a rotational direction or a reverse rotational direction of the torque converter in accordance with the rotation of the torque converter.

7 Claims, 7 Drawing Sheets

APPARATUS FOR REDUCING VIBRATION OF VEHICLE

CROSS-REFERENCE TO RELATED APPLICATION

This application claims the benefit of Korean Patent Application No. 10-2015-0067492, filed on May 14, 2015, which is incorporated herein by reference in its entirety.

FIELD

The present disclosure relates to an apparatus for reducing vibration of a vehicle.

BACKGROUND

The statements in this section merely provide background information related to the present disclosure and may not constitute prior art.

In an internal combustion engine, driving vibration due to piston gas pressure fluctuations always occurs. Such a driving vibration induces body vibration, rattle and rattle, and a booming, which adversely affects the durability of the vehicle, and may cause of reducing marketability by increasing the noise of the entire vehicle.

In particular, due to recent downsizing and high-output of the engine, the driving vibration during driving of the engine drive has further increased, and thus, uses of an inertial damper to reduce the driving vibration have increased.

Figure 1:
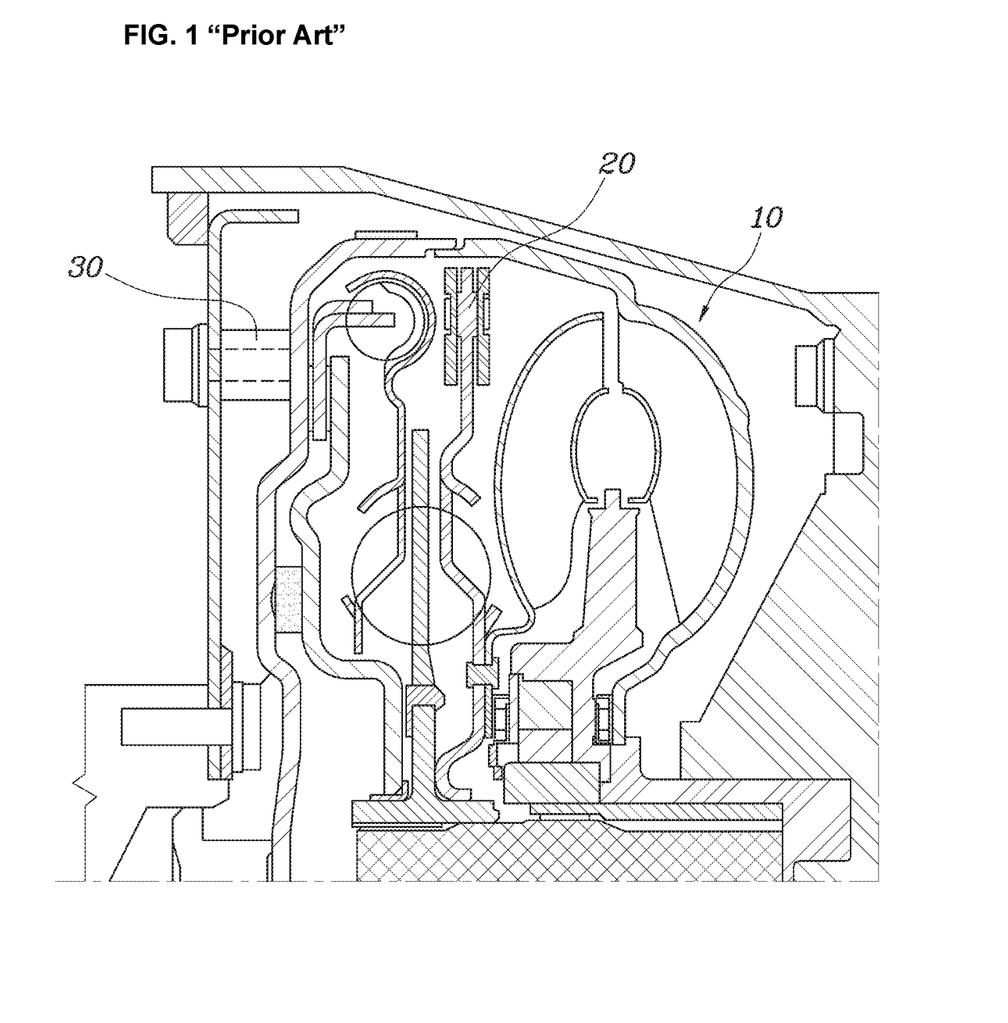
FIG. 1 is a diagram showing a conventional torque converter equipped with an inertial damper.

Generally as shown in FIG. 1, such a conventional inertial damper 20 is installed inside a torque converter 10 due to a limited external installation space, which adds a configuration inside the torque converter 10, and thus, another structure different from the existing torque converter 10 is designed. Therefore, when trying to install the inertial damper 20, the scope of the re-design is significant due to the new design of the torque converter 10 and whole length of the torque converter, and since there are a liquid performance, damper performance, and durability evaluation of the torque converter 10, the development cost and time increase. In addition, when the mass body of the inertial damper 20 moves, since the damper characteristics increase by the fluid resistance inside the torque converter 10, there has been a problem of a decline in the performance of the inertial damper.

SUMMARY

The present disclosure provides an apparatus for reducing vibration of a vehicle, and the layout changes for spatial extension can be reduced and the apparatus can be easily installed in a structure of a conventional torque converter.

In one aspect, the present disclosure provides an apparatus for reducing vibration of a vehicle that includes: a lug which connects an engine to a torque converter and forms a predetermined gap between the engine and the torque converter; and at least one inertial body which is connected to the lug between the engine and the torque converter, and moves in a rotational direction and a reverse rotational direction of the torque converter in accordance with the rotation of the torque converter.

In one embodiment, the apparatus may further include a flange coupled to the lug, and coupled with the inertial body at radially outer side than with the lug.

In another embodiment, wherein a pair of inertial bodies is provided, the flange is coupled to the inertial bodies by at least one pin and disposed between the pair of inertial bodies, and the at least one pin is coupled to the flange to penetrate therethrough so that the inertial body can move in the rotational direction and the reverse rotational direction of the torque converter.

In still another embodiment, at least one roller is provided on a periphery of the at least one pin so as to be in contact with an inner circumference of the slot.

In yet another embodiment, a ring gear may be formed to protrude from an outer periphery of the flange in a radial direction of the flange.

In still yet another embodiment, a flange which is formed in a donut shape, and in which the lug is coupled between the inner circumferential portion and the outer circumferential portion of the flange, and the inertial body is coupled between the inner circumferential portion and the outer circumferential portion.

In a further embodiment, a pair of the inertial bodies is provided, the flange is coupled to the inertial bodies between the pair of inertial bodies by at least one pin, and the at least one pin is coupled to the flange to penetrate so that the inertial bodies can move in the rotational direction and the reverse rotational direction of the torque converter.

In another further embodiment, the at least one pin is symmetrically coupled to both sides of the lug around the lug, and grooves are formed in a central portion of the inertial body so as to avoid contact between the inertial body and the lug.

In still another further embodiment, the inertial body may be formed with at least one slot so that the lug is coupled.

In yet another further embodiment, a roller may be further provided in the outer circumferential portion of the lug so as to be in contact with the inner circumferential portion of the slot.

It is understood that the term "vehicle" or "vehicular" or other similar term as used herein is inclusive of motor vehicles in general such as passenger automobiles including sports utility vehicles SUV, buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles e.g. fuels derived from resources other than petroleum. As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2b is a cross-sectional view taken from a line A-A of FIG. 2a;

FIG. 3b is a cross-sectional view taken from a line B-B of FIG. 3a;

FIG. 4b is a cross-sectional view taken from a line C-C of FIG. 4a.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is intended to cover not only the exemplary embodiments, but also various alternatives, modifications, equivalents and other embodiments, which may be included within the spirit and scope of the present disclosure as defined by the appended claims.

Figure 2A:
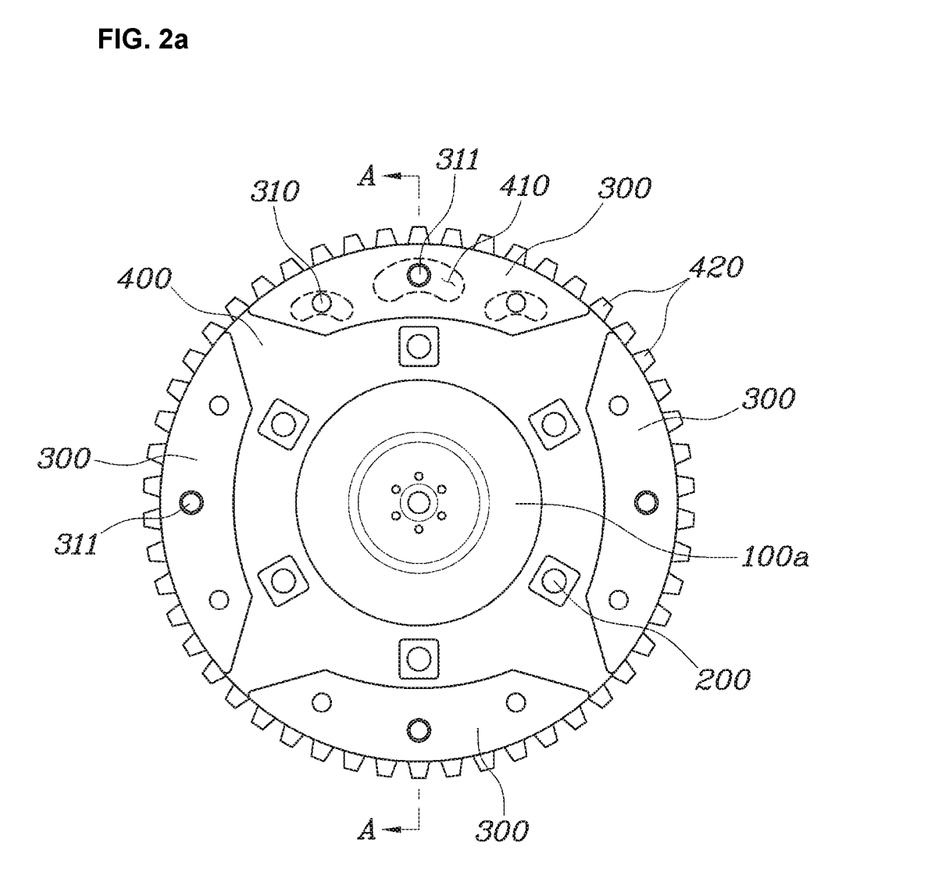
FIG. 2a is a front view of an apparatus for reducing vibration of a vehicle according to a first embodiment of the present disclosure.
Figure 2B:
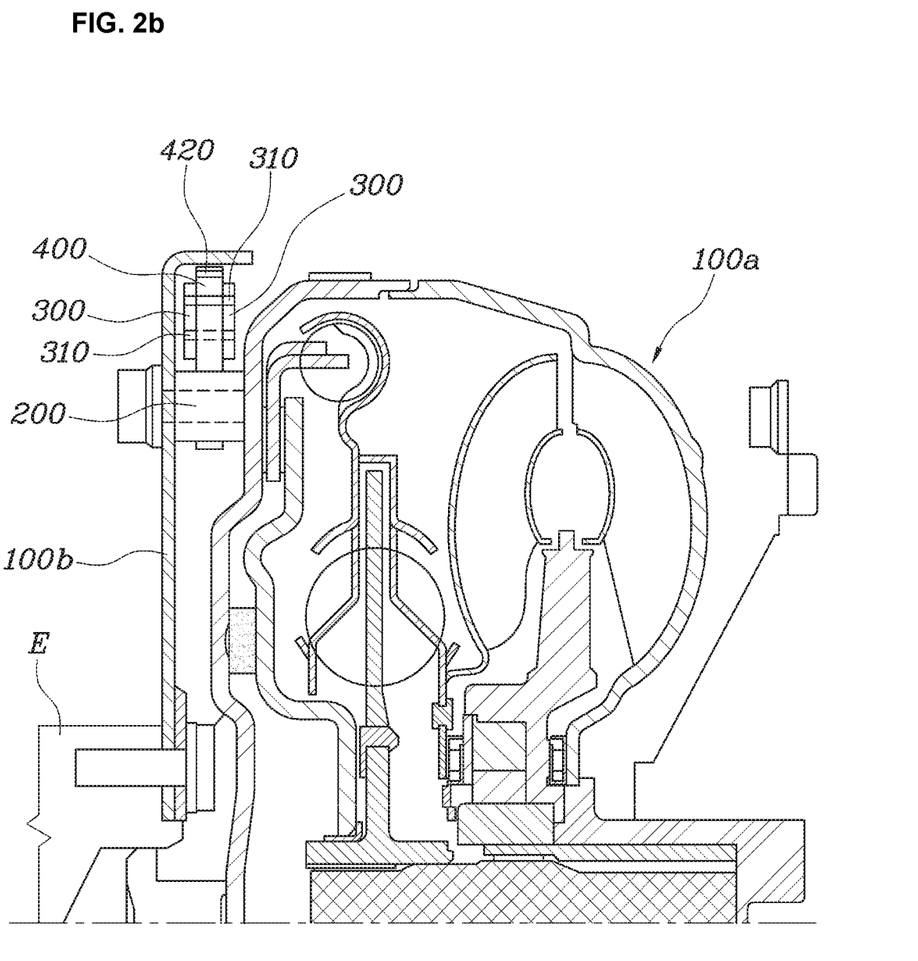

FIGS. 2a and 2b are block diagrams of an apparatus for reducing vibration of a vehicle according to a first embodiment of the present disclosure. The apparatus includes a lug 200 that connects an engine E and a torque converter 100a, and forms a predetermined interval between the engine E and the torque converter 100a; and an inertial body 300 that is connected to the lug 200 between the engine and the torque converter 100a and moves in a rotational direction or a reverse rotational direction of the torque converter 100a in accordance to the rotation of the torque converter 100a.

Specifically, the lug 200 is configured so that one end thereof is coupled to an engine drive plate 100b connected to an engine output shaft and the other end is fixed to a housing of the torque converter 100a by bolting or various coupling ways, and performs the function of transmitting the rotational force of the drive plate 100b to the torque converter 100a.

The lug 200 may have a support structure of various forms, such as a cylindrical or polygonal block, and a structural shape depending on the designer's intention. As a result, the length of the lug may be substantially same as the gap between the drive plate 100b and the torque converter 100a.

As shown in FIG. 1, in the structure of the conventional torque converter 100a, the inertial damper 20 is installed inside the torque converter 100a, and an axial interval formed by the lug 200 creates an empty space. With this arrangement, there is no choice but to vary the overall length of the torque converter 100a, and therefore, the re-design of the layout of the overall power train has been required.

According to the present disclosure, the inertial body 300 is coupled to the lug 200 provided even in the existing torque converter 100a, thereby reducing the vibration of the engine and also avoiding a re-design of the power train.

Meanwhile, FIG. 2a is a front view in which the torque converter 100a is viewed from side, and FIG. 2b is a cross-sectional view taken from a line A-A of FIG. 2a. As shown in FIGS. 2a and 2b, an apparatus for reducing vibration of a vehicle according to a first embodiment of the present application may further include a flange 400 which is coupled to the lug 200 and coupled with an inertial body 300 at radially outer side than with the lug 200.

The flange 400 may have various shapes and may be a circular plate with holes formed in a central portion such as a donut shape, the lug 200 is coupled to the inner circumferential portion of the flange 400, and the flange 400 and the lug 200 may rotate together.

A plurality of lugs 200 may be provided at predetermined intervals along the peripheral portion of the drive plate 100b, the flange 400 is formed so that the radius of the inner circumferential portion matches the peripheral portion of the drive plate 100b, and a plurality of lugs 200 may be fastened along the inner circumferential portion.

Since the flange 400 has a structure that forms a predetermined surface on the radially outer side of the drive plate 100b or the torque converter 100a and in which the inertial body 300 is coupled to the formed surface, it is possible to increase the radius of rotation of the inertial body 300 and to increase the damping efficiency.

Meanwhile, a pair of inertial bodies 300 may be provided, the flange 400 is coupled to the inertial bodies 300 between the pair of inertial bodies 300 by a pin 310, and the flange 400 may be formed with a slot 410 to which the pin 310 penetrate so that the inertial bodies 300 can move in the rotational direction or the reverse rotational direction of the torque converter 100a.

The inertial bodies 300 may be positioned on both sides of the flange 400, respectively, and the inertial bodies 300 and the flange 400 may be coupled through the slot 410 formed in the flange 400 via the pin 310. In one form, a single pin may penetrate the inertial bodies 300 and flange 400, coupling each other.

In one form, the slot 410 may extends along the rotational direction or the reverse rotational direction of the torque converter 100a, and in another form, the slot 410 may extend toward the center of rotation or various directions for efficient damping.

Also, at least one or more slots 410 may be formed, and in one form, a plurality of slots 410 may be provided, and one or a plurality of the pins 310 may be provided accordingly.

In addition, a plurality of pair of inertial bodies 300 may be provided along the circumferential direction of the flange 400, each of the inertial body 300 may be disposed to form symmetry with the center of rotation. For example, when two pairs are provided, the centers of the inertial bodies are arranged at an interval of 180 degrees, three pairs may be located to form an interval of 120 degrees, and four pairs may be located to form an interval of 90 degrees.

Meanwhile, a roller 311 may be further provided on the periphery of the pin 310 so as to be in contact with the inner circumference of the slot 410. The roller 311 may freely rotate with respect to the pin 310, surrounds the outer periphery of the pin 310 to prevent the durability damage due to the friction contact between the pin 310 and the slot 410, and can increase the mobility of the pin 310 within the slot 410.

In addition, a ring gear 420 may be formed on the outer circumferential portion of the flange 400 to protrude in the radial direction of the flange 400, the ring gear 420 is a gear that is engaged with a start motor at the time of the initial start-up of engine, the ring gear 420 is formed on the outer circumferential surface of the flange 400 and is configured so that the flange 400 protrudes to the outside of the torque converter 100a, and the inertial body 300 may be provided at a position that can improve the damping effect.

Figure 3A:
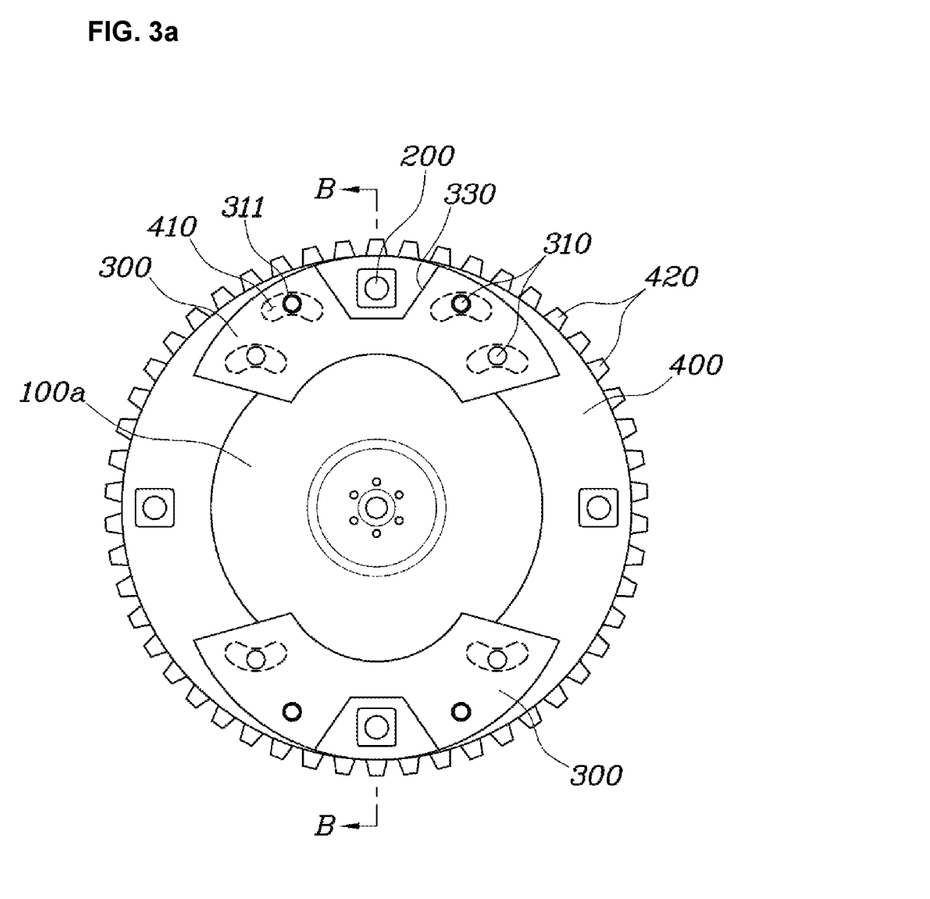
FIG. 3a is a front view of an apparatus for reducing vibration of a vehicle according to a second embodiment of the present disclosure.
Figure 3B:
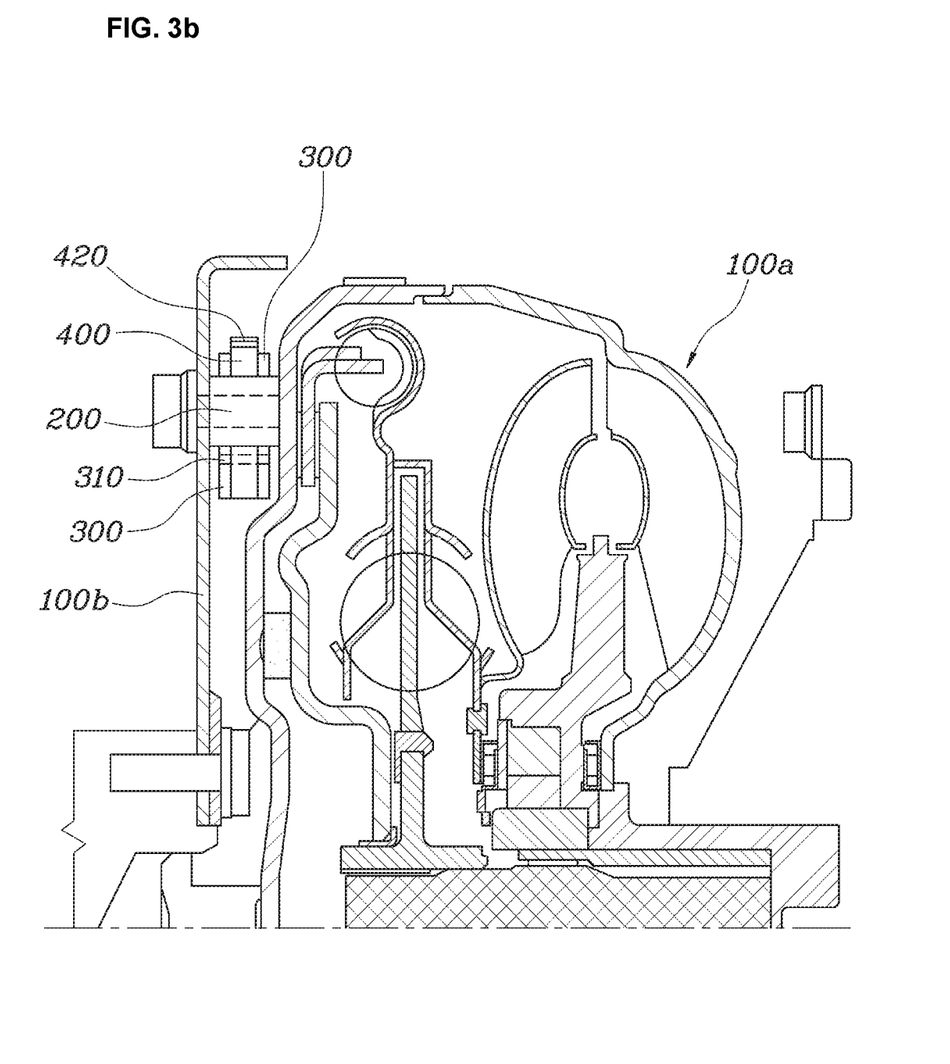

Meanwhile, FIGS. 3a and 3b are block diagrams of an apparatus for reducing vibration of a vehicle according to a second embodiment of the present disclosure, FIG. 3a is a front view that is viewed from the torque converter 100a side, and FIG. 3b is a cross-sectional view taken from a line B-B of FIG. 3a.

An apparatus for reducing vibration of a vehicle according to the second embodiment may be configured similarly to the first embodiment, the flange 400 is formed in a donut shape, a lug is coupled between the inner circumferential portion and the outer circumferential portion of the flange, and the inertial body 300 may be coupled between the inner circumferential portion and the outer circumferential portion. A pair of inertial bodies 300 is provided, the flange 400 is situated between the pair of inertial bodies 300 and coupled to the inertial body 300 by a pin, and a flange 400 may be formed with a slot 410 to which the pin 310 penetrate so that the inertial bodies 300 can move in the rotational direction or the reverse rotation direction of the torque converter. Further, a roller 311 that surrounds the pin 310 may be provided.

However, in the second embodiment, the pin 310 is coupled to the inertial body 300 and the slot 410 so as to be symmetrical on both sides of the lug 200 around the lug 200, and a groove 330 may be formed in the central portion of the inertial body 300 so as to avoid the contact between the inertial body 300 and the lug 200.

Thus, as seen in FIG. 3b, the radius of rotation of the inertial body 300 may be included in the radius of rotation of the torque converter 100a or the drive plate 100b, and even when the space is narrow on the outer side of the torque converter 100a, it is possible to install the inertial body 300 in the lug 200.

Also, FIG. 3a shows a case where the groove 330 is formed so as to open to the outside of the inertial body 300, the groove 330 may also be formed on the inside of the inertial body 300 depending on the position of the inertial body 300 and the lug 200, or even if the inertial body 300 moves in accordance with the designer's intent, it may be formed at any position of the inertial body 300 so as to be able to avoid the contact with the lug 200.

And, even in the case of the second embodiment, a ring gear 420 may be formed on an outer circumferential portion of the flange 400.

Figure 4A:
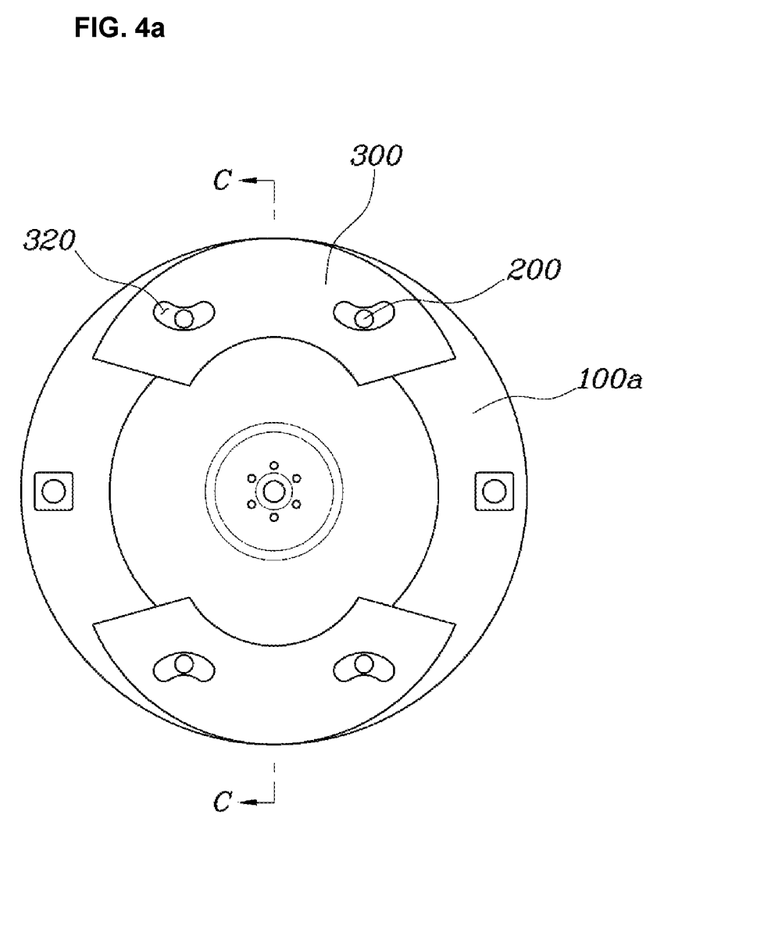
FIG. 4a is a front view of an apparatus for reducing vibration of a vehicle according to a third embodiment of the present disclosure.
Figure 4B:
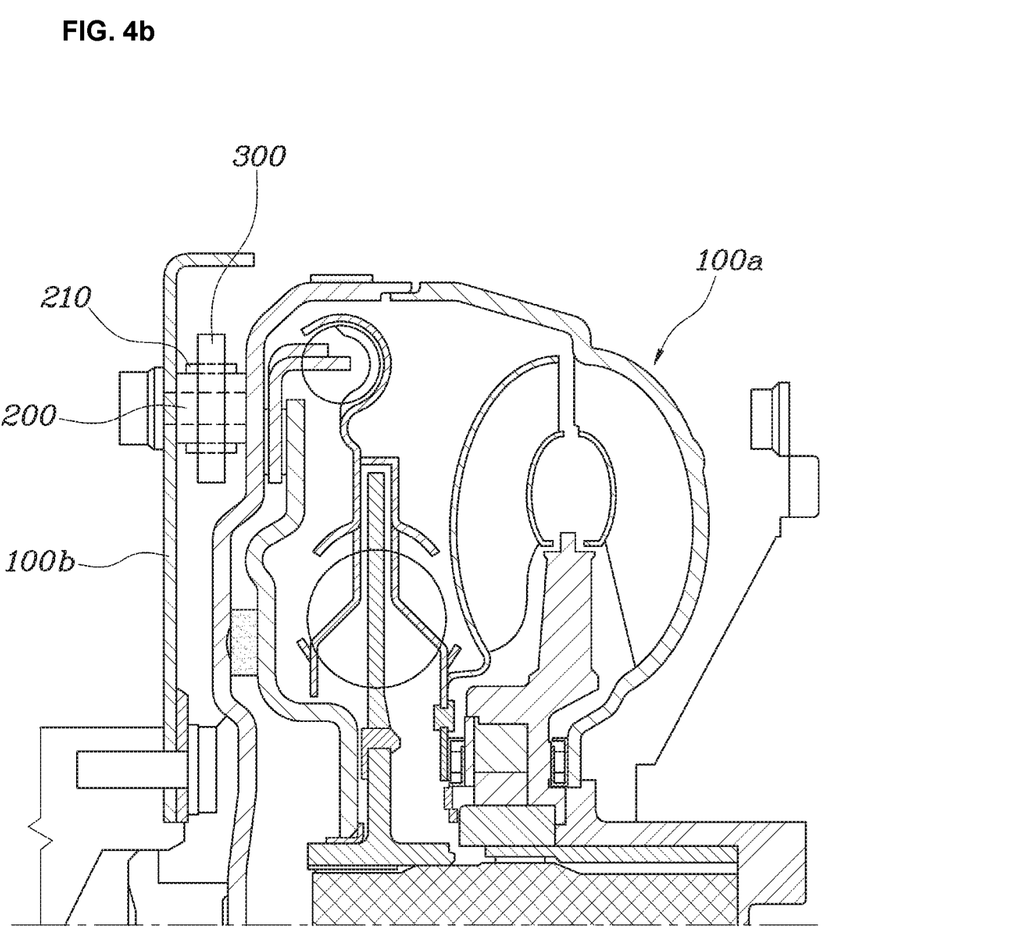

Meanwhile, FIGS. 4a and 4b are block diagrams of an apparatus for reducing vibration of a vehicle according to a third embodiment of the present disclosure, FIG. 4a is a front view that is viewed from the torque converter 100a side, and FIG. 4b is a cross-sectional view taken from a line C-C of FIG. 4a.

The apparatus for reducing vibration of a vehicle according to the third embodiment is not provided with the flange 400, and the inertial body 300 may be directly coupled to the lug 200. Thus, the inertial body 300 may be formed with the slot 320 though which the lug 200 may penetrate and be coupled each other, and the slot 320 may be formed similarly to the slot 410 formed in the flange 400 of the first or second embodiment.

In another form, one or a plurality of inertial bodies 300 may be provided in a single piece along the radius of rotation of the drive plate 100b or the torque converter 100a, rather than being formed in a pair, and when being provided in a pair, it may be formed so as to be mutually fastened through a coupling means.

Of course, a pair or a plurality of inertial bodies may be formed so as to independently move each other without being fastened depending on a designer's intention.

Also, the roller 210 may be further provided on the inner circumferential portion of the lug 200 so as to be in contact with the inner circumference of the slot 320. The roller 210 may be configured similarly to the roller 210 coupled to the pin 310 in the first or second embodiment, and the roller 210 may prevent deterioration in durability of the lug 200 and improve the mobility of the inertial body 300.

As in the third embodiment, by directly coupling the inertial body 300 to the lug 200, it is possible to simplify the configuration, and it is possible to improve the assembling process and reduce the cost.

According to the apparatus for reducing vibration of a vehicle having the above-described configuration, since it may be easily installed in a structure of a conventional torque converter, a significant change of a layout is not required, and thus it is possible to reduce the expenses associated with the re-design of the layout.

Although specific embodiments of the present disclosure have been shown and described, it will be obvious to those of ordinary skill in the art that the present disclosure can be improved and modified within the scope that does not depart from the technical idea of the present disclosure.

What is claimed is:

1. An apparatus for reducing vibration of a vehicle comprising;
   a lug connecting an engine to a torque converter and forming a predetermined gap between the engine and the torque converter; and
   at least one inertial body disposed in the predetermined gap and movably connected to a flange coupled with the lug such that the at least one inertial body is configured to move in a rotational direction or a reverse rotational direction of the torque converter in accordance with a rotation of the torque converter,
   wherein the flange includes an inner circumferential portion and an outer circumferential portion forming together a donut shape of the flange, and the lug is extended through the flange and connected to the torque converter,
   wherein the at least one inertial body comprises a pair of inertial bodies, the flange is disposed between the pair of the inertial bodies and coupled each other through at least one pin, and the flange is formed with at least one slot to which the at least one pin penetrates so that the pair of the inertial bodies are configured to move in the rotational direction or the reverse rotational direction of the torque converter.

2. The apparatus for reducing vibration according to claim 1, further comprising:
   the flange is coupled with said at least one inertial body at a radially outer side relative to the lug.

3. The apparatus for reducing vibration according to claim 2, wherein a roller is further provided on a periphery of said at least one pin so as to be in contact with an inner circumference of at least one slot.

4. The apparatus for reducing vibration according to claim 1, wherein a ring gear is formed to protrude from an outer periphery of the flange in a radial direction of the flange.

5. The apparatus for reducing vibration according to claim 1, wherein the lug is coupled between the inner circumferential portion and the outer circumferential portion of the flange, and said at least one inertial body is coupled between the inner circumferential portion and the outer circumferential portion of the flange.

6. The apparatus for reducing vibration according to claim 1, wherein said at least one pin is symmetrically coupled to both sides of the lug around the lug, and grooves are formed in a central portion of said at least one inertial body so as to avoid contact between said at least one inertial body and the lug.

7. The apparatus for reducing vibration according to claim 1, wherein the lug is directly connected to the torque converter through the flange.

* * * * *